June 11, 1957 R. K. BOYD 2,795,657

TERMINATION CIRCUIT FOR SIMULATING TELEPHONE SYSTEM CONDITIONS

Filed May 22, 1956 3 Sheets-Sheet 1

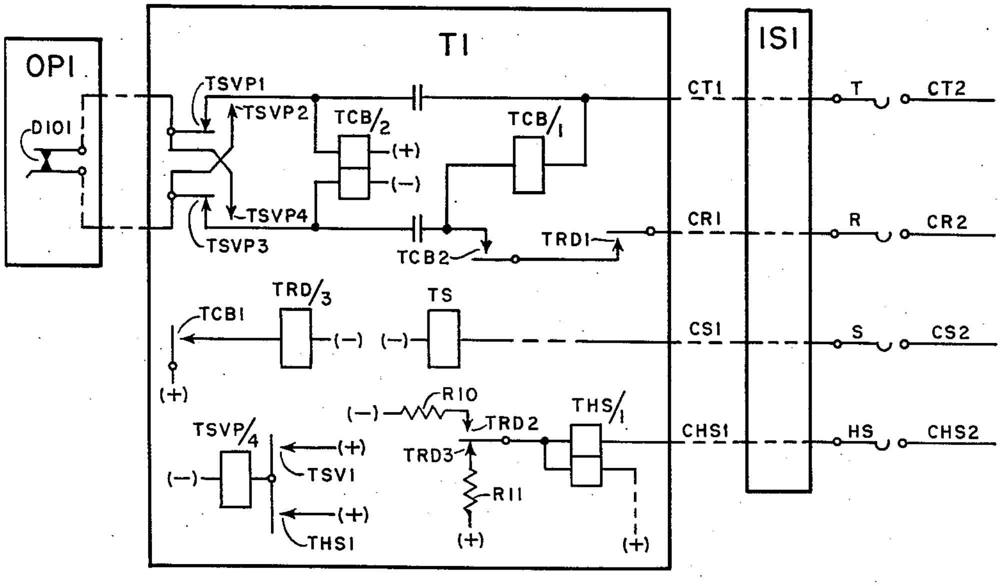

FIG. 1

| KEY | A | D | E | F | H | J | K | M |
|---|---|---|---|---|---|---|---|---|
| FUNCTION | DIAL TONE | TYPE OF FUNCTION | TIMING | INTER-RUPTION DATE | TYPE OF SIGNAL | REPORT | INITIAL STOP DIAL | TIMING |
| TYPE TEST | MISC. | INTERIM SUPV. | | | TERMINAL SUPV. | | STOP DIAL | |
| 2 | DIAL TONE | FLASH | DURING DIGIT | 30 IPM | REV. BATT. | ANS. | INITIAL STOP DIAL | AFTER DIGIT |
| 1 | NO DIAL TONE | TONE | | 60 IPM | REV. BATT. & FLASH | DA | NO INITIAL STOP DIAL | NONE |
| 3 | | FLASH & TONE | | 120 IPM | FLASH | BY | | |

FIG. 4

INVENTOR.
RICHARD K. BOYD

BY [signature]
AGENT

June 11, 1957

R. K. BOYD

TERMINATION CIRCUIT FOR SIMULATING TELEPHONE SYSTEM CONDITIONS 2,795,657

Filed May 22, 1956

3 Sheets-Sheet 2

2,795,657

TERMINATION CIRCUIT FOR SIMULATING TELEPHONE SYSTEM CONDITIONS

Richard K. Boyd, Rochester, N. Y., assignor to General Dynamics Corporation, Rochester, N. Y., a corporation of Delaware Application May 22, 1956, Serial No. 586,438

5 Claims. (Cl. 179—175.2)

Figure 2:
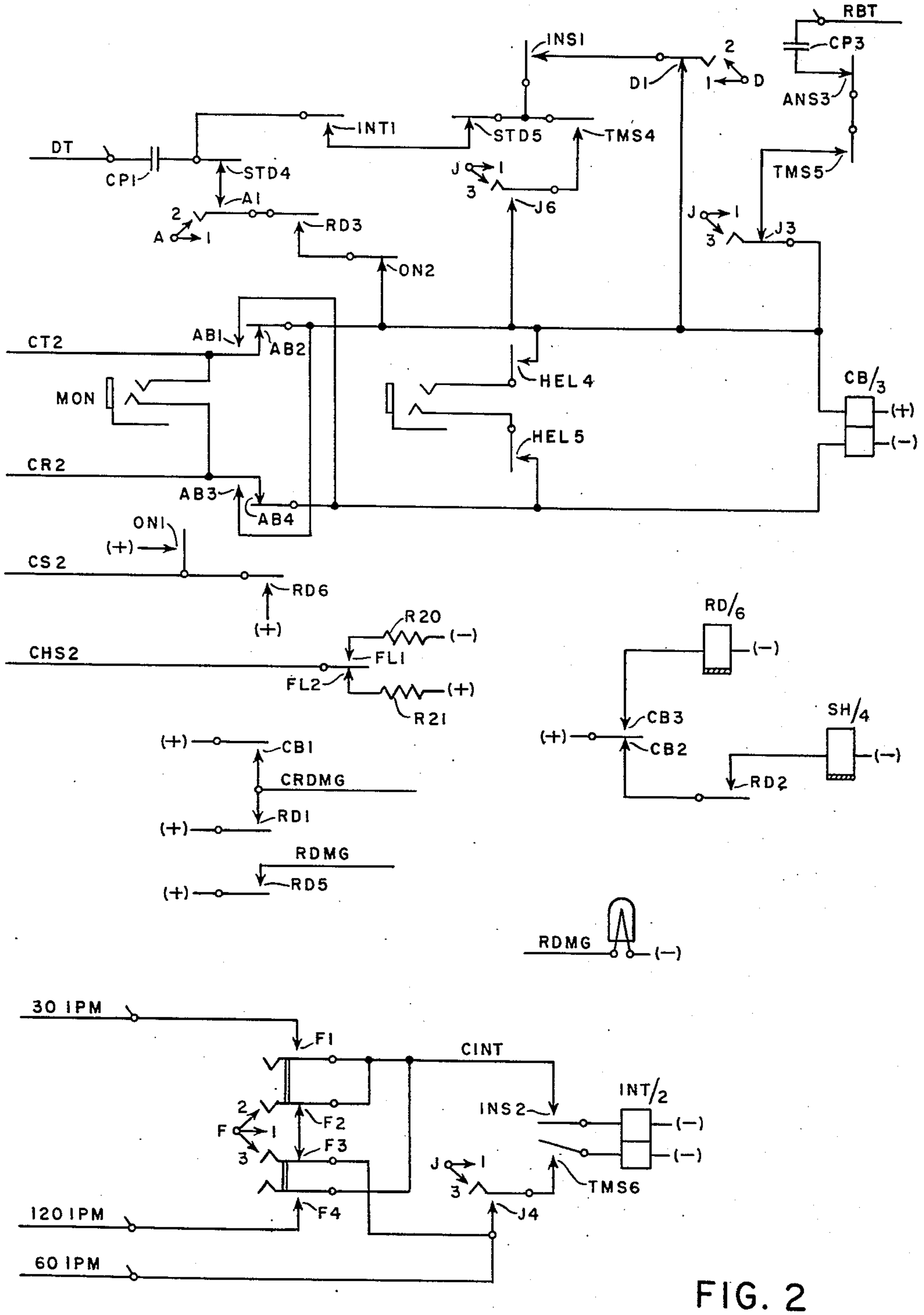

My invention relates to test apparatus for telephone systems in general and more particularly to test apparatus for simulating conditions encountered in multi-office telephone systems.

In the past, it has been the practice to provide test equipment suitable for determining whether or not signaling and supervisory equipment found in switching systems is functioning properly. However, the increased complexity of telephone systems of the type suitable for long distance dialing has made it necessary to determine whether or not the equipment in the system is functioning properly under a wider variety of conditions. These conditions may be unique to the particular system being tested and may involve testing for signaling and supervision under a number of combinations of operating conditions.

Therefore, it is an object of my invention to provide a new and improved test termination.

Another object of my invention is to provide a new and improved test termination capable of approximating the combinations of control and supervisory signals which may be actually encountered by the equipment undergoing tests.

Another object of my invention is to provide a new and improved test termination wherein supervisory signals are transmitted to the equipment under test following the transmission of a predetermined number of directive signals to the test termination.

Another object of my invention is to provide a new and improved test termination wherein supervisory signals are transmitted to the equipment under test following the transmission of a predetermined number of directive signals to the test termination and wherein the predetermined number of directive signals may be varied.

My invention is useful with a telephone system including a communication channel which may be built-up through switching apparatus and in which the switching apparatus may include means for transmitting directive signals in a forward direction to succeeding equipment and other means for receiving supervisory signals from succeeding equipment. According to the invention, I have provided a test termination to which such a communication channel may be extended by the switching apparatus. The test termination includes means for repeating directive signals which is placed under the control of the directive signal transmitting means. Similarly, the switching apparatus is effective for partially completing the supervisory signal circuit. Means such as a relay in the test termination is effective for completing the circuit in order to operate the supervisory signal receiving means within the switching apparatus. The termination also includes means for counting the number of operations of the repeating means in order to register the number of directive signals received at the test termination. In addition, means such as manually operated selecting switches are effective to control the response of the circuits of the test termination to return various test supervision signals upon the registration of a particular number of directive signals and the arrangement is such that by various settings of the selecting switches different types of test supervisory signals may be returned after different adjustably determined numbers of directive signals have been received by the test termination.

Further objects and advantages of my invention will become apparent as the following description proceeds. The points of novelty which characterize my invention are set forth with particularity in the claims annexed to and forming a part of this specification. For a better understanding of the description, reference may be had to the accompanying drawings in which:

Fig. 1 shows skeletonized representations of an originating operator position and intermediate trunk circuit and, in block form, an intermediate selector.

Figure 3:
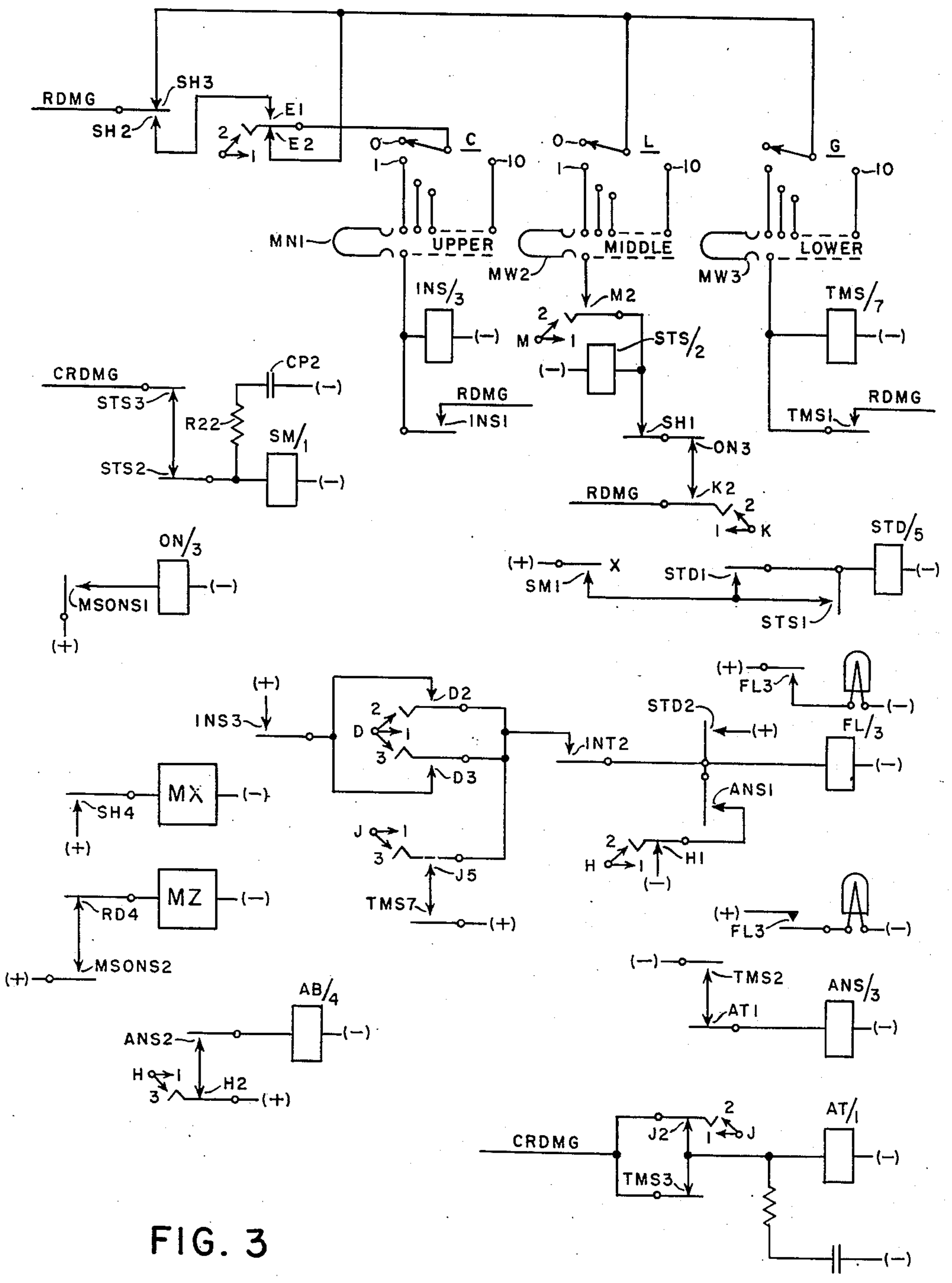

Figs. 2 and 3 when placed side by side in numerical order from left to right show a test termination accessible from the intermediate selector of Fig. 1.

Fig. 4 shows the key layout for the test termination.

The apparatus referred to in the following description is made to function from power supplied from a first source such as a battery. The most positive terminal or plate of the battery is connected to ground and is referred to hereafter as "ground" and in the drawings as (+). The most negative ungrounded terminal or plate of the battery is referred to as "battery" and in the drawings as (—). Within the test termination, a second source of power and signals is a continuously operating tone generator and interrupted signal source which supplies well-known dial and ring back tones and flashing ground signals. Such ground signals, at the rates of 30, 60 and 120 impulses per minute, are connected to conductor 30 IPM, 60 IPM, and 120 IPM, respectively.

In the test termination, manually operable, three position, cam type switches or keys are used for setting up the testing apparatus. The keys are shown in the drawings with upper and lower contact sets. Each key has a normal position in which its upper and lower spring sets are unoperated. When the key is in normal position, the arrow associated with each key representing the position of the cam is in position 1. When a key has been operated so that the upper contact set is actuated, the indicating arrow is in position 2. Similarly, when the key is operated so that the lower contact set is actuated, the indicating arrow is shown in position 3.

EXTENSION OF A CONNECTION TO THE TEST TERMINATION

Referring to Fig. 1, in the preferred embodiment of my invention the equipment on which a test is to be performed includes apparatus such as trunk circuit T1 through which a connection may be built up from an operator position OP through switching equipment (not shown). Trunk T1 is individual to an incoming selector such as IS1 which may be used for further extending the connection. Because neither the operator equipment apparatus nor the intermediate switching equipment forms a part of the present invention, it is not considered to be necessary to describe their function in detail here.

Upon the completion of a connection from position OP1 to trunk T1, a circuit is completed for operating trunk calling bridge relay TCB over the following circuit: from ground, through the upper winding of relay TCB, break contacts TSVP1, dial spring contacts DIO1, and break contacts TSVP3 and the lower winding of relay TCB to battery. The operation of relay TCB completes a circuit for operating trunk release delay relay TRD from ground through make contacts TCB1 and the winding of relay TRD to battery. The operation of relay TRD is effective for transferring conductor CHS1 and the windings of trunk hunt sleeve relay THS from their normal connection to ground through resistor R11 and break contacts TRD3 to a connection to battery through resistor R10 at make contacts TRD2.

The operation of relays TCB and TRD is effective for seizing incoming selector IS1 by completing a well-known operating loop between conductors CT1 and CR1 which is traced from conductor CT1 through the winding of trunk supervisory relay TSV, make contacts TCB2 and TRD1 to conductor CR1. Because selector IS1 operates in a manner well understood by those skilled in the telephone art, and the selector does not form a part of my invention, the following description of the operation of the selector has been confined to generalities only.

The seizure of selector IS1 is effective for causing means within the selector to apply ground potential to conductor CS1 and thereby complete an obvious operating circuit for trunk sleeve relay TS. The seizure of selector IS1 renders well-known means in selector IS1 responsive to directive signals caused by the operation of signal transmitting means comprising relay TCB. The transmission of directive signals from the operator position OP1 dial is effective for causing signal transmitting means comprising relay TCB to repeat the directive signals to the selector IS1. Each signal incoming to relay TCB comprises a train of one or more impulses caused by the opening and reclosing of the above-traced operating circuit for relay TCB at dial contacts D101. Thus, relay TCB releases and reoperates in response to each impulse within the train. Each release of relay TCB is effective for opening the above-described loop at make contacts TCB2, thereby causing a train of impulses to be repeated to selector IS1 and, later, to other succeeding equipment.

The directive operation of the signal responsive means within selector IS1 is effective for moving the set of wipers comprising wipers T, R, S and HS into engagement with a set of terminals such as the set to which conductors CT2, CR2, CS2 and CHS2 are connected.

*Seizure of the test termination*

Assuming that the test termination of the invention having conductors CT2, CR2, CS2 and CHS2 is in idle condition, other means within selector IS1 is effective for completing a metallic connection from conductors CT1, CR1, CS1, and CHS1 to conductors CT2, CR2, CS2, and CHS2 respectively and for disconnecting the seizure responsive apparatus from conductors CT1, CR1, CS1, and CHS1. The completion of the connection between the conductors of trunk T1 and the conductors incoming to the test termination is effective for completing an operating circuit for impulse responsive means comprising calling bridge relay CB within the test termination. The circuit is traced from ground through the upper winding of relay CB, break contacts AB2, conductor CT2, selector switch wiper T, conductor CT1, the winding of relay TSV, make contacts TCB2 and TRD1, conductor CR1, selector switch wiper R, conductor CR2, break contacts AB4 and the lower winding of relay CB to battery. Relay CB thereupon operates.

The operation of relay CB is effective for operating seizure means comprising release delay relay RD from ground through make contacts CB3 and the winding of relay RD to battery. The operation of relay RD is effective for applying ground to incoming conductor CS2 in order to maintain trunk sleeve relay TS operated over the following circuit: from ground through make contacts RD6, conductor CS2, selector switch wiper S, conductor CS1, and the winding of relay TS to battery.

The operation of relay RD1 is also effective for preparing an operating circuit for shunt relay SH at make contacts RD2; applying ground to a first master ground conductor CRDMG at make contacts RD1; applying ground to a second master ground conductor RDMG at make contacts RD5; preparing a connection between the dial tone conductor DT and the incoming loop at make contacts RD3; and for opening an operating circuit for release magnet MZ of a minor switch at break contacts RD4.

The application of ground to conductor CRDMG is effective at this time for operating answer test relay AT and relay SM. The circuit for operating relay AT is traced from grounded conductor CRDMG through parallel break contacts J2 and TMS3 and the winding of relay AT to battery. The operating circuit for relay SM is traced from grounded conductor CRDMG through break contacts STD3 and STS2 and the winding of relay SM to battery. Capacitor CP2, in parallel with the winding of relay SM charges through resistor R22. The effect of the operation of relays AT and SM is to be explained presently.

OPERATION OF THE TEST TERMINATION

*Counting of directive signals*

Means comprising relay CB is effective in response to the operation of the impulse transmitting means comprising make contacts TCB in trunk circuit T1 for repeating directive signals. As in the case of signals incoming to trunk circuit T1, each directive signal transmitted to the test termination comprises a train of one or more impulses caused by the momentary opening of the previously traced operating circuit of relay CB at make contacts TCB2.

The momentary opening of the operating circuit of relay RD at break contacts CB3 during the transmission of these trains of impulses is insufficient to allow relay RD, a slow release type, to release at this point. Upon each release of relay CB, a circuit is completed for operating shunt relay SH from ground through break contacts CB2, make contacts RD2 and the winding of relay SH to battery. Relay SH is a slow release type and is therefore operated upon the first release of relay CB and held operated throughout a repetition of a train of impulses by relay CB, even though its above-traced operating circuit may be momentarily opened at contacts CB2. At the conclusion of the repetition operation of relay CB, relay CB comes to rest in its operated condition, thereby opening the previously traced circuit of relay SH at make contacts CB2. Relay SH thereafter releases. Thus, it is seen that relay SH is operated once for each signal transmitted to relay CB for repetition by relay CB.

The test termination includes means comprising a minor switch for counting the number of operations of or times that the repeating means is caused to repeat trains of digit impulses as indicated by the number of operations of relay SH. The minor switch comprises wipers MW1, MW2 and MW3 for successive advancement from their normal position into engagement with the upper, middle and lower terminal banks, respectively, to which the wipers have access. The switch includes means comprising magnet MX operative for advancing the wipers one step at a time across the terminal banks and a release magnet MZ for releasing the switch.

The operation of relay SH is effective for energizing magnet MX from ground through make contacts SH4 and magnet MX to battery. Thus, each repetitive operation of relay SH responsive to the impulses of each digit is effective for energizing magnet MX to advance the wipers MW1, MW2 and MW3 one position across the banks of the minor switch. Accordingly, the particular terminals engaged by wipers MW1, MW2 and MW3 at the conclusion of the repeating operations of relay CB indicates the number of directive signals transmitted to the repeating means comprising relay CB.

The movement of the wipers of the minor switch away from their normal positions is effective for operating other means comprising contact springs for indicating the off-normal condition of the minor switch. Thus, the operation of the minor switch is effective for completing an operating circuit for off-normal relay ON from ground through make off-normal contacts MSONS1 and the winding of relay ON to battery. Relay ON thereupon operates. The operation of the off-normal means is also effective for preparing a path for operating the release means for the minor switch comprising magnet MZ at off-normal make contacts MSONS2.

*Testing.*—A manually operated selecting switch having a normal position (shown in the drawing as "0") and as many operated positions as there are contacts in the minor switch bank is associated with each minor switch bank. Each one of the selecting switch contacts is connected to the corresponding one of the minor switch bank contacts. Thus, the contacts of selecting switches C, L and G are connected to the contacts of the upper, middle and lower minor switch banks, respectively. These independently operable selecting switches are effective in combination with the minor switch for controlling means within the test termination which in turn are effective for causing circuit completing means within the test termination to pass back to the preceding connection interim and terminal supervisory signals and stop dial signals in the manner set forth in the following paragraphs. Switches C, L and G are associated with test termination apparatus for controlling the transmission of intermediate, stop dial and terminal supervisory signals, respectively. When it is required that a signal of one of these classes be transmitted to the equipment under test, the corresponding selecting switch is operated to the position indicating the number of directive signals to be received at the test termination prior to the signal transmission. The other selecting switches are left in this normal or home position.

Returning to the consideration of the preceding equipment to be tested, trunk circuit T1 is provided with first and second means for receiving supervisory signals comprising relays TSV and THS, respectively. Relay TSV is of the polar type and is unoperated when current flows in the direction described in connection with the aforementioned operation of relay CB. The test termination is provided with means comprising relay AB which is operative for reversing the direction of flow of current to the winding and thereby causing relay TSV to operate.

Relay THS in trunk circuit T1 is arranged for differential duplex operation, so that when trunk circuit T1 is seized in the previously described manner, the transfer of the winding connection from resistance ground to resistance battery fails to operate relay THS even though resistance ground is connected to the right-hand terminal of the upper winding through resistor R21, break contacts FL2, conductor CHS2, selector switch wiper HS, and conductor CHS1 after a connection has been extended from trunk T1 to the test termination. On the other hand, relay THS is operated when means comprising flashing relay FL within the test termination is operated to transfer conductor CHS2 from its resistance ground connection through resistor R21 by way of break contacts FL2 to a battery connection by way of resistor R20 and make contacts FL1. In addition to supplying direct current supervisory signals to the equipment under test, the test termination is provided with means for connecting dial tone and busy tone to the connector under test in order to provide audible supervisory signals. The operation of relay FL and other signal control equipment is controlled by other equipment in the test termination in a manner to be later described.

Within trunk T1 the operation of either relay THS or TSV is effective for operating supervisory repeater relay TSVP over circuits including make contact THS1 or TSV1. The operation of relay TSVP is effective for reversing the direction of current flow over the loop to operator position OP1, thereby operating signaling means (not shown) to indicate the receipt of a supervisory signal to the operator.

The appropriate ones of the manually operable cam type keys in the test termination and selecting switches C, L, or G are preset prior to the establishment of the connection from trunk circuit T1 to the test termination in order to cause the test termination to send back supervisory signals to the trunk upon the simulation of a situation within the switching apparatus, such as seizure of the equipment succeeding trunk T1 or the transmission of a predetermined number of directive signals from the apparatus under test following the seizure of the test termination.

*Dial tone.*—With dial tone key A in its normal position 1, no dial tone is applied to the trunk under test upon the seizure of the test termination. With key A in its operated 2 position, a circuit is completed for applying dial tone upon seizure of the test termination which is traced from the tone source (not shown) through conductor DT, blocking capacitor CP1, break contacts STD4, tone key make contacts A1 and relay make contacts RD3, and break contacts ON2 to the upper winding of relay CB. The connection of dial tone to the winding of relay CB is effective for extending the dial tone signal over the previously described operating circuit of relay TSV. Upon the transmission of a directive signal to the repeating means in the test termination the subsequent operation of the minor switch and minor switch off-normal relay ON is effective for disconnecting the dial tone source from the equipment under test by opening the above-traced circuit at break contacts ON2.

*Interim supervisory test.*—Interim supervisory signals include those signals which are ordinarily transmitted in a backward direction (i. e., toward the originating point) prior to the extension of a connection through the switching apparatus to the destination point. In the preferred embodiment of my invention, such interim supervisory signals may be transmitted as signals for causing a flashing operation of the differential duplex signaling relay THS or for the transmission of interrupted dial tone over the talking channel, or both. Type of function key D is provided for selecting which of these combinations of signals is to be used. Thus, in its normal position 1, tone only is transmitted to the equipment under test. In operated position 2, flashing supervision over the differential duplex signaling only is transmitted. In operated position 3, both flash supervision and tone are transmitted.

Interruption rate key F is provided for determining the rate at which tone and flash signals are to be applied to the apparatus under test determining which of the 30 IPM, 60 IPM, and 120 IPM conductors is to be connected to conductor CINT and thence to the upper winding of interrupter relay INT. Thus, with key F in normal position 1, conductor 60 IPM is connected to conductor CINT through break contacts F3 and F2. With key F in operated position 2, conductor 30 IPM is connected to conductor CINT through make contacts F1. Similarly, with key F in operated position 3, conductor 120 IPM is connected to conductor CINT through make contacts F4.

In the case chosen for discussion here, assume that selecting switch C has been placed in its third position, and switches G and L are in their home positions. Thus, upon the advance of the minor switch wipers to the point where wiper MW1 engages the corresponding third terminal of the upper bank, a circuit is prepared for operating means comprising intermediate supervision relay INS. Assuming that timing key E is in its normal position, after the transmission of the third directive signal and the release of relay SH, the circuit is completed from grounded conductor RDMG through break contacts SH3 and E2, the third terminals of switch C and the upper minor switch wiper bank, wiper MW1 and the winding of relay INS to battery. Relay INS thereupon operates and locks itself in operated condition from ground supplied through grounded conductor RDMG and make contacts INS1 to the winding of relay INS.

The operation of relay INS is effective for closing an operating circuit for relay INT from conductor CINT through make contacts INS2 and the upper winding of relay INT to battery. As previously described, the position to which interruption rate key F is operated determines the frequency at which relay INT operates and releases. In the event that type of function key D is in its normal position 1 (i. e., tone supervisory signals only), the operation of the flashing relay INT is effective for intermittently connecting dial tone to the upper winding of relay CB and through the previously described talking channel to operator position OP1. The circuit is traced from conductor DT through capacitor CP1, make contacts INT1, break contacts STD5, make contacts INS1, break contacts D1 and the operating loop of relay TSV.

In the event that key D is in operated position 2 (i e., flash signal only), the above-traced tone connecting circuit is opened at break contacts D1, and a circuit is completed for intermittently operating flash relay FL from ground through make contacts INS3, D2, and INT2 and the winding of relay FL to battery. The flashing operation of relay FL is effective in the previously described manner to pass back a flashing supervisory signal over conductor CHS2 to the supervisory repeating means comprising relay THS at trunk T1. In the event that key D is in operated position 3 (flash and tone), the above-traced tone connecting circuit is completed in the previously described manner to apply interrupted dial tone to the equipment under test. In addition, an obvious energizing circuit for relay FL is completed at make contacts D3. Thus, flash and tone supervisory signals are passed back to the supervisory signal repeating means in the equipment under test.

In the event that timing key E is in operated position 2, the previously described operating circuit for relay INS is opened at break contacts E2 and a second operating circuit for relay INS is completed for operating relay INS upon the advance of the wiper MW1 into engagement with the third terminal of the upper bank while relay SH2 is still operated instead of after relay SH2 is released as previously described. The second operating circuit is traced from grounded conductor RDMG through make contacts SH2 and E1, the terminals of the selecting switch C and the upper bank of the minor switch, wiper MW1 and the winding of relay INS to battery. Thus, relay INS operates with the above-described effect at passing back either or both supervisory signals while the signal responsible for advancing the minor switch into engagement with the third conductor is still being transmitted.

*Stop dial supervision.*—The test termination is equipped with means for sending back a stop dial supervisory signal to the apparatus under test. Assume that selecting switch L has been operated to its third position, and that switches C and G are in their home positions. Assuming further that initial stop dial key K is in normal position 1 and timing key M is in operated position 2, means comprising selecting switch L is effective in response to the advance of minor switch wiper MW2 to the third terminal of the middle bank for completing an operating circuit for stop supervisory relay STS. The circuit is traced from grounded conductor RDMG through break contacts SH3, the third terminals of switch L and the middle bank of the minor switch, wiper MW2, make contacts M2 and the winding of relay STS to battery. Relay STS operates.

The operation of relay STS is effective for completing an operating circuit for stop dial relay STD which is traced from ground through preliminary make contacts SM1 of the previously operated relay SM and relay contacts STS1 to the winding of relay STD and battery. The operation of relay STD is effective for closing a locking circuit for itself from ground through preliminary make contacts SM1 and STD1 and the winding of relay STD to battery. The operation of relay STS is also effective for disconnecting the winding of relay SM1 from its previously traced operating circuit at break contacts STS2. However, the presence of the charged capacitor CP2 in series with resistor R22 across the winding of relay SM is effective for holding relay SM in its operated condition during the time that capacitor CP2 is discharged through the winding of relay SM. Thus, it is seen that relay SM, which is effective in its operated condition for holding relay STD operated, releases a predetermined time interval following the operation of relay STS.

The operation of relay STD is effective for closing an operating circuit for flash relay FL at make contacts STD2. Relay FL operates at this time to pass back a supervisory signal over conductor CHS2 to relay THS in trunk T1. The operation of relay STD is also effective for opening the previously described connection between the dial tone conductor DT and the test termination at break contacts STD4 and STD5 so that no tone signal is transmitted to the apparatus under test during the time that relay STD is in operated condition.

Upon the discharge of capacitor CP2, relay SM1 releases, thereby opening at the above described operating and holding circuits for relay STD at make contacts SM1. Relay STD releases at this time.

The release of relay STD is effective for opening the operating circuit of relay FL at make contacts STD2 so that relay FL thereupon releases to discontinue the supervisory signal to relay THS. The release of relay STD is also effective for reclosing the prepared circuit for applying dial tone to the test termination at break contacts STD4 and STD5.

In the event that it is required that an initial stop dial signal be passed back to the equipment under test upon the seizure of the test termination, initial stop dial key K is operated to position 2 for the purpose of immediately operating relay STS upon the seizure of the switch (i. e., when relays CB and RD are operated and ground potential is placed on conductor RDMG). The circuit is traced from conductor RDMG through make contacts K2, break contacts ON3 and SH1, and the winding of relay STS to battery. The operation of relay STS is effective in the previously described manner for operating relays STD and FL and thereafter releasing relays SM1 and STD and FL, so that a stop dial signal is passed back to trunk T1 over conductor CHS2 in the previously described manner.

*Terminal supervision.*—The test termination is equipped with means for providing terminal supervision (i. e., the supervisory signals ordinarily transmitted in the course of extending a connection through the switching apparatus when the connection has been extended to the point at which the connection is to be terminated, such as subscriber lines, operator positions, and the like). The supervision passed back may be either a reverse battery signal for operating relay TSV in the apparatus under test, or a signal passed back over conductor CHS2 for controlling relay THS. Provision also is made in the test termination for providing both such signals. The selection of signals is made by type of signal key H. Thus, when key H is in normal position 1, both reverse battery and flash supervision signals are passed back. When the key is in position 2, only reverse battery supervision is transmitted; and when key H is in operated position 3, only flash supervision is passed back. Similarly, the operation of the equipment is controlled by the position of report key J. Thus, when key J is in normal position 1, the test termination equipment sends no answer supervisory signals to simulate a "don't answer" (DA) condition; when key J is in operated position 2, the equipment is effective for sending back answer supervision; and when key J is in operated position 3, the equipment is effective for sending back a busy signal.

Assuming that selecting switch G has been operated to its third position, switches C and L are in their home positions, and that key J is in operated position 2, switch G is operative in response to the advance of minor switch wiper MW3 to the third terminal in the lower bank upon the release of relay SH for completing an operating circuit for terminal supervisory relay TMS. The circuit is traced from grounded conductor RMDG through break contacts SH3, the third terminals of the switch G and the lower bank of minor switch, wiper MW3, and the winding of relay TMS to battery. The operation of relay TMS is effective for completing a locking circuit for itself from grounded conductor RMDG through make contacts TMS1 and the winding of relay TMS to battery.

The operation of relay TMS and with key J in position 2 is effective for opening the previously traced operating circuit of answer test relay AT at contacts TMS3 and J2. Relay AT thereupon releases.

The operation of relay TMS is effective following the release of relay AT for closing an operating circuit for the answer relay ANS. The circuit is traced from ground through make contacts TMS2, break contacts AT1 and the winding of relay ANS to battery. Relay ANS thereupon operates.

Prior to the above-described operation of relay ANS, the operation of relay TMS is effective for applying ring back tone to the talking conductors of the test termination from the ring back tone source (not shown) through conductor RB7, capacitor CP3, break contacts ANS3, make contacts TMS5, and break contacts J3 to the upper winding of relay CB and to the equipment under test by way of conductor CT2. The aforementioned operation of relay ANS is effective for opening the above-described ring back tone connection at break contacts ANS3 in order to remove the tone.

The operation of relay ANS is also effective for closing an operating circuit for answering bridge relay AB from ground through break contacts H2, make contacts ANS2, and the winding of relay AB to battery. The operation of relay AB is effective for reversing the direction of current flow through the above-traced circuit of supervisory relay TSV in trunk T1 by closing make contacts AB1 and AB3 and opening break contacts AB2 and AB4. The operation of relay ANS is further effective for closing an operating circuit for relay FL from ground through break contacts H1, make contacts ANS1 and the winding of relay FL to battery. The operation of relay FL is effective in the previously described manner to send back a supervisory signal over conductor CHS2 to cause relay THS in trunk T1 to operate.

With report key J in its normal position 1, the operating circuit for relay AT continues to be closed at contacts J2 and, consequently, relay AT continues to be held operated. With relay AT in its operated condition, the operating circuit for relay ANS is held open at make contacts AT1 in order to prevent the operation of relay ANS at this time. Thus, the ring back tone continues to be applied to the talking conductors of the test terminal, and relays AB and FL remain unoperated in order to simulate a DA condition to the equipment under test.

The operation of key J to position 3 also allows relay AT to remain in its operated condition. Consequently, relays ANS and AB remain unoperated throughout the next described operation. The operation of key J to position 3 is, however, effective for completing a circuit for energizing the lower winding of relay INT from conductor 60 IPM through make contacts J4 and TMS6 and the lower winding of relay INT to battery. Relay INT therefore operates at the rate of 60 interruptions per minute. This flashing operation of relay INT is effective for operating flash relay FL at the same rate. The circuit for operating relay FL is traced from ground through make contacts TMS7, J5, INT2 and the winding of relay FL to battery. The flashing operation of relay FL is effective in the previously described manner for transmitting a flashing supervisory signal over conductor CHS2 to relay THS in trunk T1. The flashing operation of relay INT is effective for connecting interrupted dial tone to the talking conductors of the test termination over the following circuit: from conductor DT, through blocking capacitor CP1, make contacts INT1, break contacts STD5, make contacts TMS4 and J6 to the upper winding of relay CB and the talking conductors of the test termination. The operation of key J to position 3 is effective for opening the previously described connection of the ring back tone conductor RBT at break contacts J3 in order to prevent the transmission of a reverting ringing signal to the apparatus under test.

RELEASE

At the conclusion of the testing operation, the connection built up through trunk T1 and including the test termination may be released in the usual manner by opening the operating loop of relay TCB, thereby releasing relays TCB and TRD. The release of relay TRD is effective for opening the operating loop of relay CB in the test termination at make contacts TRD1. Relay CB in the test termination thereupon releases, opening the operating circuit of relay RD at make contacts CB3. Relay RD releases. The release of relays RD and CB is effective for removing ground from conductor CRDMG by opening make contacts CB1 and RD1. Ground is similarly removed from conductor RDMG in response to the release of relay RD by opening make contacts RD5. The removal of ground from conductors CRDMG and RDMG is effective for opening the operating and/or locking circuits for any or all of the following relays: relays INS, STS, TMS, AT, and SM. The release of relay RD is effective for completing an operating circuit for release magnet MZ of the minor switch. The latter circuit is traced from ground through minor switch off-normal make contacts MSONS2, break contacts RD4 and magnet MZ to battery. The operation of relay MZ is effective for restoring the wipers MW1, MW2 and MW3 to their normal positions and for restoring all of the minor off switch off-normal springs to their normal positions. The test termination is now in its normal condition and ready for further use.

The release of relays RD and ON is effective for opening the ground connection to conductor CS2 at make contacts ON1 and RD6. The removal of ground from conductor CS2 is effective for causing well-known means in selector IS1 to restore the selector IS1 to its normal condition and for opening the above-described holding circuit of relay TS in termination TT1.

While I have shown and described a particular embodiment of my invention, it will be obvious to those skilled in the art that changes and modifications may be made without departing from my invention in its broader aspects. I therefore aim, in the appended claims, to cover all such changes and modifications as fall within the true spirit and scope of my invention.

What is claimed is:

1. In a telephone system having a communication channel with means for transmitting directive signals and means for receiving supervisory signals, a test termination comprising a source of supervisory signals and means for repeating directive signals, connecting means for placing said repeating means under the control of said directive signal transmitting means and for preparing a connection between said signal source and said supervisory signal receiving means, means in said termination for thereafter completing a connection between said supervisory signal source and said supervisory signal receiving means, counting means operative in response to each operation of said repeating means for registering the number of directive signals received by said repeating means, and means operative in response to a particular registering operation of said counting means for operating said circuit completing means, whereby said means for receiving supervisory signals is operative after a predetermined number of operations of said signal transmitting means.

2. In a telephone system having a communication channel with means for transmitting directive signals and means for receiving supervisory signals together with a circuit for operating said supervisory signal receiving means, a test termination comprising a source of supervisory signals and means for repeating directive signals, connecting means for placing said repeating means under the control of said directive signal transmitting means and for partially completing said supervisory signal circuit, means in said termination for completing said circuit to operate said supervisory signal receiving means, means for counting the number of operations of said repeating means and operative to register the number of directive signals received by said repeating means, and other means operative in response to a particular registering operation of said counting means for operating said circuit completing means, whereby said means for receiving supervisory signals is operative after a predetermined number of operations of said signal transmitting means.

3. The invention of claim 2 and having selecting means operative for causing said other means to be responsive to any one of a number of registering operations of said counting means.

4. In a telephone system having a communication channel including means for transmitting directive signals and means for receiving supervisory signals together with a first circuit for operating said supervisory receiving means, a test termination comprising a source of supervisory signals and means for repeating directive signals, connecting means for placing said repeating means under the control of said directive signal transmitting means and for extending said first circuit to said termination, means in said termination for completing said first circuit to operate said supervisory signal receiving means, a minor switch comprising a wiper, a bank of contacts to be engaged by said wiper and means for stepping said wiper over said contact bank, a second circuit completed in response to each operation of said repeating means for energizing said advancing means in order to advance said wiper one step upon the receipt of each directive signal, and a third circuit completed in response to the advance of said wiper to a particular one of said contacts in said bank for operating said supervisory circuit completing means, whereby said means for receiving supervisory signals is operative after a predetermined number of operations of said signal transmitting means.

5. The system set forth in claim 4 and having in addition means including a selecting switch comprising a plurality of terminals and a wiper, each of said selecting switch terminals corresponding to one of the contacts in said minor switch bank and connected thereto, and wherein said selecting switch wiper is included in said third circuit, whereby said selecting switch may be preset in order to cause said means for receiving supervisory signals to be operated after a predetermined number of operations of said signal transmitting means and said predetermined number is determined by the setting of said selecting switch.

No references cited.